United States Patent
Poels et al.

(10) Patent No.: US 7,559,662 B2
(45) Date of Patent: Jul. 14, 2009

(54) MIRROR WITH EPOXY PAINT LAYER HAVING GOOD RESISTANCE TO HANDLING

(75) Inventors: Jean-Pierre Poels, Villers-la-Ville (BE); Muriel Tournay, legal representative, Villers-la-Ville (BE); Georges Pilloy, Jumet (BE)

(73) Assignee: AGC Flat Glass Europe SA, Watermael-Boitsfort (BE)

( * ) Notice: Subject to any disclaimer, the term of this patent is extended or adjusted under 35 U.S.C. 154(b) by 92 days.

(21) Appl. No.: 10/561,148

(22) PCT Filed: Jun. 17, 2004

(86) PCT No.: PCT/EP2004/051156

§ 371 (c)(1),
(2), (4) Date: Mar. 12, 2007

(87) PCT Pub. No.: WO2004/113247

PCT Pub. Date: Dec. 29, 2004

(65) Prior Publication Data

US 2007/0177284 A1    Aug. 2, 2007

(30) Foreign Application Priority Data

Jun. 18, 2003   (WO) ............... PCT/EP03/50234

(51) Int. Cl.
*G02B 7/182* (2006.01)
*G02B 5/08* (2006.01)
*B05D 5/06* (2006.01)

(52) U.S. Cl. ..................... 359/883; 427/162
(58) Field of Classification Search ............... None
See application file for complete search history.

(56) References Cited

U.S. PATENT DOCUMENTS

| 4,894,278 | A | | 1/1990 | Servais et al. |
| 5,096,785 | A | * | 3/1992 | Somerhausen et al. ...... 428/626 |
| 5,240,776 | A | * | 8/1993 | Servais et al. ............... 428/434 |
| 6,147,803 | A | * | 11/2000 | Laroche et al. ............. 359/584 |
| 6,565,217 | B2 | | 5/2003 | Laroche et al. |

FOREIGN PATENT DOCUMENTS

| DE | 252367 | 12/1987 |
| EP | 0678485 | 10/1995 |

* cited by examiner

*Primary Examiner*—Stephone B Allen
*Assistant Examiner*—Jennifer L. Doak
(74) *Attorney, Agent, or Firm*—Oblon, Spivak, McClelland, Maier & Neustadt, P.C.

(57) ABSTRACT

Mirrors having a glass substrate, a silver coating layer on a surface of the glass substrate and an exposed epoxy paint layer overlaying the silver coating layer. The mirrors show a scratch resistance determined by the Clemen test showing scratches of less than 10 μm when applying a weight of 1500 g; a hardness determined by the Persoz pendulum of at least 250 s; and a commercially acceptable resistance to at least three glues amongst oxime, alcoxy, MS polymer and rubber.

26 Claims, 1 Drawing Sheet

MIRROR WITH EPOXY PAINT LAYER HAVING GOOD RESISTANCE TO HANDLING

CROSS REFERENCE TO RELATED APPLICATIONS

This is the U.S. National Stage of PCT/EP2004/051156 filed 17 Jun. 2004 which claims priority to from PCT/EP2003/50234 filed 18 Jun. 2003, each of which is hereby incorporated by reference.

BACKGROUND OF THE INVENTION

This invention relates to mirrors and to a process of manufacturing mirrors.

The mirrors of this invention may have various applications, for example: domestic mirrors used for example in furniture, wardrobes or bathrooms; mirrors in make-up boxes or kits; mirrors used in the automotive industry, as rear-view mirrors for cars, for example. Such mirrors may be produced by applying a silver coating on glass sheets, particularly on soda lime glass, flat glass or float glass.

Conventionally, silver mirrors have been produced as follows: the glass was first of all polished and then sensitised, typically using an aqueous solution of $SnCl_2$; after rinsing, the surface of the glass was usually activated by means of an ammoniacal silver nitrate treatment, and a silvering solution was then applied in order to form an opaque coating of silver; this silver coating was then covered with a protective layer of copper and then with one or more coats of leaded paint in order to produce the finished mirror. The combination of the protective copper layer and the leaded paint was deemed necessary to provide acceptable aging characteristics and sufficient corrosion resistance.

More recently, Glaverbel developed mirrors which dispensed with the need for the conventional copper layer, which could use substantially lead-free paints and yet which still had acceptable or even improved aging characteristics and corrosion resistance. For example, U.S. Pat. No. 6,565,217 describes embodiments of a mirror with no copper layer which comprises in the order recited: a vitreous substrate; both tin and at least one material selected from the group consisting of palladium, bismuth, chromium, gold, indium, nickel, platinum, rhodium, ruthenium, titanium, vanadium and zinc provided at a surface of the vitreous substrate; a silver coating layer on said surface of the substrate; at least one material selected from the group consisting of tin, chromium, titanium, ion, indium, copper and aluminium present at the surface of the silver coating layer which is adjacent to an at least one paint layer; and at least one paint layer covering the silver coating layer. Such mirrors provided a significant advance with respect to conventional coppered mirrors. Nevertheless, during transportation, handling and on cutting tables, care has to be taken with respect to such mirrors to avoid scratches in the paint layer and/or in the silver layer. Furthermore, such mirrors are compatible with and chemically resistant to only some types of adhesive available on the market.

SUMMARY OF THE INVENTION

According to one of its aspects, the present invention provides a mirror with no copper layer as defined by claim 1. Other claims define preferred and/or alternative aspects of the invention.

Mirrors according to the invention preferably have good aging and corrosion resistance, preferably at least similar to aging and corrosion resistance of mirrors of the type described in U.S. Pat. No. 6,565,217, together with improved physical properties, particularly resistance to scratching during handling.

The term "exposed paint layer" means that this paint layer is adapted in use of the finished mirror to be exposed to the surrounding environment. It is thus this exposed paint layer that will generally be exposed to handling operations which could cause scratches and/or which will be in direct contact with adhesives used to secure the rear face of the mirror to a surface.

The use of a single paint layer in some embodiments is advantageous in that it renders the manufacture process simpler. In alternative embodiments, mirrors may have more than one layer of paint and the paint layer furthest from the glass, i.e. the paint layer exposed to air, is an epoxy paint layer. The other paint layer or layers may be of various natures, for example an alkyd based paint, and may be provided as an undercoat of paint beneath the epoxy paint layer.

The Clemen test, the hardness test with the Persoz pendulum and the glue resistance tests are all described hereunder. The properties and/or combination of properties defined with respect to these tests reflect the improved physical and physico-chemical properties of the mirrors according to the present invention. In addition to these properties, mirrors according to the present invention preferably also have an acceptable or even improved resistance to aging and/or corrosion; this is defined with reference to the CASS test and/or with reference to the salt fog test.

During transportation and handling of mirrors having the defined properties of scratch resistance and/or hardness, the care with which the mirrors have to be handled may be reduced to a reasonable degree. Previously, for example, mirror cutting tables had to be kept perfectly free of any glass splinter or any hard dust to avoid scratching the backside of the mirror, i.e. the painted side of the mirror. This was time consuming to implement and check between every cutting operation. With mirrors according to the present invention the multiple, fastidious and time-consuming tasks of controlling the conditions of handling of mirrors may be reduced. Of course, care should always be used when transporting and handling mirrors, but with the present invention, this care may be reduced to a more reasonable level. Additionally or alternatively, the mechanical resistance may reduce damage to and/or rejection of mirrors due to handling. Mirrors having the defined level of mechanical resistance may be manufactured on an industrial scale, at a cost similar to equivalent existing mirrors, with aging and/or corrosion resistance similar to equivalent existing mirrors and yet may provide improved scratch resistance which facilitates their handling and/or reduces damage and/or rejections due to handling. A scratch resistance determined by the Clemen test showing scratches of less than 10 μm, preferably in the range 2-10 μm, when applying a weight of 1500 g and/or a hardness determined by the Persoz pendulum of at least 250 s, preferably within the range 280-300 s, allows manufacture of mirrors on an industrial scale which may be subsequently handled with a reasonable level of care.

Resistance to at least one glue selected from the group consisting of oxime, alcoxy, MS polymer and rubber glues provides compatibility with desirable adhesives. Previously, great care was necessary in the selection of adhesives for attaching mirrors to avoid any physico-chemical attack by the glue. With the mirrors according to the present invention, the range of adhesives compatible with the mirrors may be enlarged. Preferably, mirrors according to the invention are resistant to two, three or all the glues selected from the group consisting of oxime, alcoxy, MS polymer and rubber glues.

Advantageously, one or more material may be deposited during an activating step on a surface of the glass substrate on which the silver layer is to be deposited; this may contribute to the corrosion resistance of the mirror. Such materials may be selected from the group consisting of palladium, tin, bismuth, chromium, gold, indium, nickel, platinum, rhodium, ruthenium, titanium, vanadium and zinc. Palladium is preferred. Tin may be provided at or on a surface of the glass substrate on which the silver layer is to be deposited; this may sensitise the glass substrate and may facilitate adhesion of the silver layer thereto. The glass substrate may be sensitised prior to being activated, activated prior to being sensitised or sensitised and activated simultaneously.

Materials provided at the surface of the glass substrate during an activating and/or sensitising step are preferably provided as islets, that is to say that preferably such do not produce a distinct continuous layer of, for example, palladium, but that the material is in the form of islets on the surface of the glass.

Preferably, the epoxy paint layer has a thickness in the range 25-55 µm, more preferably in the range 35-45 µm, and still more preferably, in the range 35-40 µm. Such ranges of thickness may provide mirrors with a good resistance to scratches during their transportation and handling and to a good resistance to adhesives used for maintaining them on a support.

In another preferred embodiment, tin is present at the surface of the silver coating layer which is provided adjacent to the paint layer covering the silver coating layer or which is provided adjacent to an undercoat paint layer covering the silver coating layer. Tin may be deposited on the silver layer before the deposition of the paint layer or layers in order to contribute to the corrosion resistance of the mirror. Tin may be deposited by treatment of the silvered glass substrate with an acidified aqueous solution of Sn(II) salt. Alternatively or additionally, at least one material selected from the group consisting of chromium, vanadium, titanium, iron, indium, copper and aluminium may be present at the surface of the silver coating layer which is adjacent to the single paint layer covering the silver coating layer or which is provided adjacent to the undercoat paint layer covering the silver coating layer; this may be achieved by treatment of the silver coating may be treated with a solution containing at least one of Cr (II), V (II or III), Ti (II or III), Fe (II), In (I or II), Cu (I) and Al (III).

Preferably, the silver coating layer has a thickness in the range 60 to 110 nm, more preferably 70 to 100 nm. These values offer a good compromise between a good light reflection value for the mirror and an acceptable cost of production.

In one preferred embodiment, the paint layer or layers applied over the silver layer are substantially lead-free, and in particular, the epoxy paint layer is substantially lead-free. Conventionally, silver coating layers of mirrors were protected by an overcoat of copper. The copper layer was itself protected from abrasion and corrosion by a layer of paint. The paint formulations which afforded acceptable levels of protection against aging and/or corrosion contained lead pigments. The proportion of lead in such a leaded paint layer could be around 13000 mg/m$^2$. The mirrors according to the present invention not only dispense with the need for a copper layer but they also allow the use of paints which are substantially lead-free. This is advantageous in that lead is toxic and its avoidance has environmental benefits. Substantially lead-free means herein that the proportion of lead in the paint is significantly less than the proportion of lead in leaded paints conventionally used for mirror. The proportion of lead in a substantially lead-free paint layer as herein defined is less than 500 mg/m$^2$, preferably less than 400 mg/m$^2$, more preferably less than 300 mg/m$^2$.

Traces of silane may be present at the surface of the silver coating layer which is provided adjacent to the single paint layer covering the silver coating layer or which is provided adjacent to the undercoat paint layer covering the silver coating layer. The treatment of the silver coating layer with a silane before painting may enhance and/or contribute towards the resistance of the mirror to abrasion and/or corrosion.

In methods of manufacturing mirrors according to certain aspects of the invention, the sensitising and activating steps may contribute to the aging and/or corrosion resistance of the mirrors and/or to their durability. Preferably the sensitising step is carried out prior to the activating step and the activating step before silvering. Preferably, the solutions brought into contact with the glass substrate during the successive manufacturing steps are sprayed onto the glass substrate with optional intervening rinsing and/or washing steps.

For example, during the industrial manufacture of flat mirrors, sheets of glass pass may through successive stations where sensitisation, activation and silvering reagents are sprayed. In practice, on a mirror production line, the sheets of glass are generally conveyed along a path by a roller conveyor. They are first of all polished and rinsed prior to being sensitised by means for example of a tin chloride solution sprayed on the glass; they are then rinsed again. An activating solution is then sprayed onto the sheets of glass, this activating solution may be for example, an acidic aqueous solution of PdCl$_2$. The sheets of glass then pass to a rinsing station where demineralised water is sprayed, and then to the silvering station where a traditional silvering solution is sprayed, the silvering solution being combined just before application to the glass from two solutions, one solution comprising a silver salt and either a reducing agent or a base and the other solution comprising whichever component (a reducing agent or a base) which is absent from the solution containing the silver salt. The flow rate and concentration of the silvering solution sprayed onto the glass are controlled so as to form a layer of silver containing between 700 and 900 mg/m$^2$ of silver, preferably in the range 800-850 mg/m$^2$ of silver. The glass is then rinsed and directly after the rinsing of the silver coating, a freshly formed acidified solution of for example tin chloride is sprayed onto the silvered glass sheets as they move forward along the conveyor. The mirrors may then be treated by spraying with a solution containing a silane. After rinsing and drying, the mirrors are covered with a single epoxy paint layer or at least two paint layers, from which at least the exposed paint layer is an epoxy paint layer. The paint is then cured or dried, for example in a tunnel oven.

Preferably, the paint is applied onto the silvered substrates in the form of a continuous curtain of liquid paint falling onto the glass sheets in a curtain coating process. Preferably, a single layer of an epoxy paint is deposited on the glass substrate. This facilitates the process as only one curtain of paint is needed and has to be controlled.

Previously, paints used to protect mirrors with no copper layer generally comprised 30 to 35% solvents by weight. The present invention may allow use of an epoxy paint which, when applied to the glass substrate has a solvent content of less than 25%, for example 10-20%, preferably 13-17%, more preferably about 15% by weight. Furthermore, the thickness of the epoxy paint layer according to the present invention may be less than the thickness of the paint layer or layers of known copperless mirrors (which was commonly approximately 55 µm thick); thus the total quantity of solvents used may be significantly less than that used for prior industrial manufacture of mirrors. This reduction in the use of solvents, which may be a reduction of between a half and two thirds, may be beneficial from a cost and/or process and/or environmental perspective.

The thickness of the glass substrate may be greater than 1 mm, 2 mm or 2.5 mm; it may be less than 10 mm, 8 mm or 6 mm. The thickness of the glass substrate may be within the range or 1.8 mm to 8.2 mm.

The finished mirror may have a luminous reflectance of greater than 85%, preferably greater than 90%.

Preferably, mirrors according to the present invention are substantially or entirely free of formaldehydes. This may provide further environmental advantages.

DETAILED DESCRIPTION

An embodiment of the invention will now be further described, by way of example only, along with a comparative example.

Examples 1 and 2 & Comparative Example 1

Figure 1:
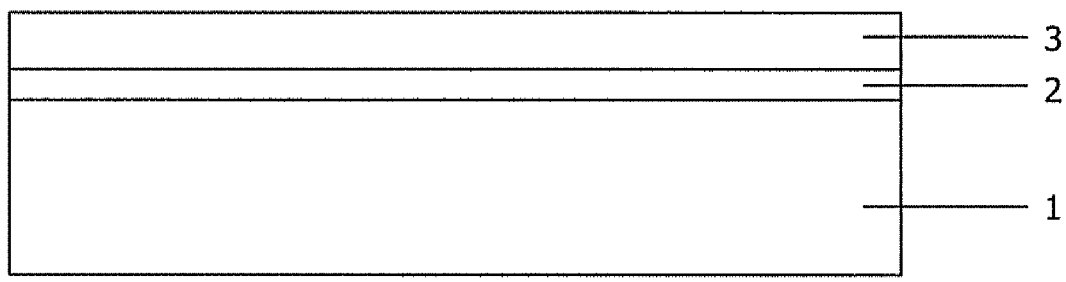
FIG. 1 is a diagrammatic illustration of one embodiment of the invention.

In FIG. 1, a mirror includes a glass substrate 1 having a silver coating 2 and an epoxy paint layer 3.

Figure 2:
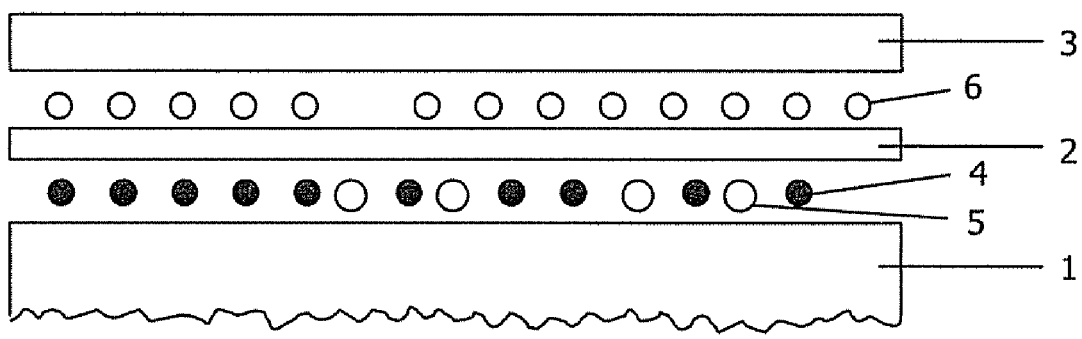
FIG. 2 is a diagrammatic exploded illustration of another embodiment of the invention.

In FIG. 2, a mirror includes a glass substrate 1 having a silver coating 2 and an epoxy paint layer 3. Illustrated in FIG. 2 is s material 4 from a sensitisation step, a material 5 from an activation step, and a material 6 deposited on the silver coating layer 2 adjacent the paint layer 3. The mirrors may be manufactured as follows.

Mirrors according to the invention are manufactured on a conventional mirror production line in which flat sheets of soda lime float glass are conveyed along the line by a roller conveyor.

The sheets of glass are first of all polished, rinsed and then sensitised by means of a tin chloride solution, in the usual manner; they are then rinsed again. An acidic aqueous solution of $PdCl_2$ is then sprayed onto the sheets of glass following the teaching of U.S. Pat. No. 6,565,217. The sheets of glass then pass to a rinsing station where demineralised water is sprayed, and then to the silvering station where a traditional silvering solution is sprayed to form a layer containing approximately 800-850 $mg/m^2$ of silver. The glass is then rinsed by spraying with water and, directly after the rinsing of the silver coating, a freshly formed acidified solution of tin chloride is sprayed onto the silvered glass sheets. The mirrors are then treated by spraying with a solution containing 0.1% by volume of γ-aminopropyl triethoxysilane (Silane A 1100 from Union Carbide).

After rinsing and drying, the mirrors are curtain coated with a single layer of an epoxy paint layer and pass through a furnace to evaporate solvents present in the paint and to cure the paint. The thickness of the single layer of an epoxy paint is approximately 35 μm (dry thickness after curing).

Mirrors manufactured in this manner are subjected to various tests: ageing and/or corrosion tests (CASS test and Salt Fog test), scratch resistance test (Clemen test), hardness test determined by the Persoz pendulum, glue resistance tests (bain marie test and humid Chamber test).

One indication of the corrosion resistance and/or resistance to ageing of a mirror incorporating a silver film can be given by subjecting it to a copper-accelerated acetic acid salt spray test known as the CASS test in which the mirror is placed in a testing chamber at 50° C. and is subjected to the action of a fog formed by spraying an aqueous solution containing 50 g/l sodium chloride, 0.26 g/l anhydrous cuprous chloride with sufficient glacial acetic acid to bring the pH of the sprayed solution to between 3.1 and 3.3. Full details of this test are set out in International Standard ISO 9227-1990. Mirrors may be subjected to the action of the saline fog for different lengths of time, whereafter the reflective properties of the artificially aged mirror may be compared with the reflective properties of the freshly formed mirror. We find that an exposure time of 120 hours gives a useful indication of the resistance of a mirror to ageing. We perform the CASS test on 10 cm square mirror tiles having freshly cut edges, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean average of these ten measurements is calculated. One can also measure the maximum corrosion present at the margin of the tile to obtain a result which is again measured in micrometers; preferably, the maximum corrosion is less than 300μ, more preferably less than 250μ.

For a more representative evaluation, the CASS test may be performed on ten samples of a mirror and the mean average of the ten samples calculated from the mean average of each sample.

Preferably, the mirrors have less than five white spots per $dm^2$ following the CASS test, more preferably, less than one white spot per $dm^2$ Another indication of the corrosion resistance and/or resistance to ageing of a silver mirror can be given by subjecting it to a Salt Fog test which consists in subjecting the mirror to the action, in a chamber maintained at 35° C., of a salt fog formed by spraying an aqueous solution containing 50 g/l sodium chloride. We find that an exposure time of 480 hours to the Salt Fog test gives a useful indication of the resistance of a mirror to ageing. Full details of this test are set out in International Standard ISO 9227-1990. The mirror is again subjected to microscopic examination, and the corrosion present at the margin of the tile is measured to obtain a result in micrometers, in the same way as in the CASS test.

For a more representative evaluation, the salt fog test may be performed on five samples of a mirror and the mean average of the five samples calculated from the mean average of each sample.

The Clemen test is used to evaluate the scratch resistance of the mirror paint. A tungsten carbide tipped needle is pressed onto the mirror paint by applying a load on the needle. The needle is used to scratch the mirror paint over a distance of about 60 mm. Several weights (from 250 g till 2500 g with an interval of 250 g) may be applied on the same mirror sample with a certain distance between each of the scratches. Hence a series of parallel scratches may be made into the sample. Full details of this test are set out in International Standard ISO 1518-1992.

The paint hardness is measured with a Persoz pendulum. The samples are conditioned at a temperature of 20° C. during at least 24 hours prior to the hardness measurement. The pendulum hardness test is based on the principle that the amplitude of the pendulum's oscillation will decrease more quickly when supported on a softer surface. The Persoz test measures the time for the amplitude to decrease from 12° to 4°. Full details of this test are set out in International Standard ISO 1522-1998.

The bain marie and humid chamber tests have for purpose to test the resistance to and/or compatibility with glues. A blob of glue with a diameter of about 5 cm is put on the back of a 10×10 cm mirror sample. The glue thickness is regulated to 2 mm with a 2 mm thick spacer. In the bain marie test, the test samples are immersed in the bain marie immediately after application of the glue. The water temperature of the bain marie is regulated at 35° C. For each adhesive family, a separate bain marie is used. In the humid chamber test, the test samples are placed in the humid chamber after 10 days polymerisation of the glue at room temperature and ambient conditions. The humid chamber is regulated at a temperature of 40° C. Both tests have a duration of 20 days. The evaluation of the results of these tests are categorised under 4 headings:

Unacceptable: a haze modification is noticed when observed under daylight.
Borderline: a haze modification is noticed when observed in a dark room under diffuse light.
Acceptable: a haze modification is noticed when observed in a dark room under a spot light.
O.K.: no haze modification can be noticed.

Note that the haze modification may appear under the glue spot or beside the glue spot.

A comparative example not in accordance with the invention is also subjected to the same tests. The comparative example is manufactured from as described above, except that the epoxy paint layer is replaced by a two-layers paint coating comprising a first coat of approximately 25 μm and a second coat of approximately 30 μm of both of an alkyd based paint. The comparative example corresponds to a copperless mirror as previously known.

The results of the tests on the mirrors of examples 1, 2 and the comparative example are as set out in table I.

TABLE I

|  | Example 1 | Example 2 | comparative example |
|---|---|---|---|
| CASS test average in μm | 117 | 103 | 132 |
| Salt Fog test average in μm | 33 | 40 | about 30 |
| Clemen test with a weight of 1500 g | 4 μm | 3 μm | 22 μm |
| Persoz pendulum | 318 s | 306 s | 150 s |
| Bain marie and humid chamber tests |  |  |  |
| Type of glues: |  |  |  |
| Oxime | OK | OK | OK |
| Alcoxy | OK | OK | OK |
| MS polymer | OK | OK | Unacceptable |
| Rubber | OK | OK | Unacceptable |

The term "commercially acceptable resistance" as used herein in relation to a glue means that the results of subjecting a sample of a mirror to the Bain Marie test or the humid chamber test are "acceptable" or "ok" on the scale defined above. Preferably, the results of the Bain Marie test and the humid chamber test are "acceptable" or "ok" on the scale defined above both for samples subjected to mirror Bain Marie test and for separate samples subjected to the humid chamber test.

The invention claimed is:
1. A mirror which comprises:
a glass substrate;
a silver coating layer on a surface of the glass substrate; and
an exposed paint layer overlaying the silver coating layer, this paint layer being an epoxy paint layer;
the mirror having all of the following properties:
(a) a scratch resistance determined by the Clemen test showing scratches of less than 10 μm when applying a weight of 1500 g;
(b) a hardness determined by the Persoz pendulum of at least 250 s;
(c) a commercially acceptable resistance to at least three glues selected from the group consisting of an oxime, an alcoxy, a MS polymer and a rubber glue.

2. The mirror according to claim 1, in which at least one material selected from the group consisting of bismuth, chromium, gold, indium, nickel, palladium, platinum, rhodium, ruthenium, titanium, vanadium and zinc is provided at the surface of the glass substrate which is coated with the silver coating layer.

3. The mirror according to claim 1, in which the exposed epoxy paint layer is the only layer of paint of the mirror.

4. The mirror according to claim 1, wherein the mirror has commercially acceptable resistance to all the glues selected from the group consisting of an oxime, an alcoxy, a MS polymer and a rubber glue.

5. The mirror according to claim 1, wherein tin is present at the surface of the glass substrate adjacent to the silver layer.

6. The mirror according to claim 1, wherein the epoxy paint layer has a thickness in the range 25-55 μm.

7. The mirror according to claim 6, wherein the epoxy paint layer has a thickness in the range 35-40 μm.

8. The mirror according to claim 1, wherein at least one material selected from the group consisting of tin, chromium, vanadium, titanium, iron, indium, copper and aluminum is present at the surface of the silver coating layer which is adjacent to the paint layer overlaying the silver coating layer.

9. The mirror according to claim 1, wherein the silver coating layer has a thickness of 60 to 10 nm.

10. The mirror according to claim 1, wherein the epoxy paint layer is substantially lead-free.

11. The mirror according to claim 1, wherein traces of silane are present at the surface of the silver coating layer adjacent to the paint layer.

12. The mirror according to claim 1, wherein the mirror has an average edge corrosion of less that 200 μm when subjected to a 120 hour CASS test.

13. The mirror according to claim 1, wherein the mirror has an average edge corrosion of less that 50 μm when subjected to a 480 hour salt fog test.

14. A mirror with no copper layer which consists essentially of, in the order recited:
a substrate in the form of a flat, soda lime glass sheet having a surface,
palladium and tin provided at said surface of the glass sheet,
a silver coating layer on said surface of the glass sheet,
tin present at the surface of the silver coating layer,
a single, exposed paint layer covering the silver coating layer, this paint layer being an epoxy paint layer;
the mirror having all of the following properties:
(a) a scratch resistance determined by the Clemen test showing scratches of less than 10 μm when applying a weight of 1500 g;
(b) a hardness determined by the Persoz pendulum of at least 250 s;
(c) a commercially acceptable resistance to at least three glues selected from the group consisting of an oxime, an alcoxy, a MS polymer and a rubber glue;
(d) an average edge corrosion of less that 200 μm when subjected to a 120 hour CASS test.

15. A mirror with no copper layer which comprises:
a glass substrate;
at least one of
(i) palladium provided at a surface of the glass substrate;
(ii) at least one material selected from the group consisting of bismuth, chromium, gold, indium, nickel, platinum, rhodium, ruthenium, titanium, vanadium and zinc provided at a surface of the glass substrate;
a silver coating layer on said surface of the glass substrate; and
an exposed paint layer overlaying the silver coating layer, this paint layer being an epoxy paint layer;
the mirror having all of the following properties:
(a) a scratch resistance determined by the Clemen test showing scratches of less than 10 μm when applying a weight of 1500 g;
(b) a hardness determined by the Persoz pendulum of at least 250 s;
(c) a commercially acceptable resistance to at least three glues selected from the group consisting of an oxime, an alcoxy, a MS polymer and a rubber glue.

16. A mirror according to claim 15 in which the exposed epoxy paint layer is the only paint layer of the mirror.

17. A mirror according to claim 15 in which the mirror has commercially acceptable resistance to all the glues selected from the group consisting of an oxime, an alcoxy, a MS polymer and a rubber glue.

18. The mirror according to claim 15 wherein tin is present at the surface of the glass substrate adjacent to the silver layer.

19. The mirror according to claim 15 wherein the epoxy paint layer has a thickness in the range 25-55 μm.

20. The mirror according to claim 19 wherein the epoxy paint layer has a thickness in the range 35-40 μm.

21. The mirror according to claim 15 wherein at least one material selected from the group consisting of tin, chromium, vanadium, titanium, iron, indium, copper and aluminum is present at the surface of the silver coating layer which is adjacent to the paint layer overlaying the silver coating layer.

22. The mirror according to claim 15 wherein the silver coating layer has a thickness of 60 to 110 nm.

23. The mirror according to claim 15 wherein the epoxy paint layer is substantially lead-free.

24. The mirror according to claim 15 wherein traces of silane are present at the surface of the silver coating layer adjacent to the paint layer.

25. The mirror according to claim 15 wherein the mirror has an average edge corrosion of less that 200 μm when subjected to a 120 hour CASS test.

26. The mirror according to claim 15 wherein the mirror has an average edge corrosion of less that 50 μm when subjected to a 480 hour salt fog test.

* * * * *